US005745321A

United States Patent [19]

Faure

[11] Patent Number: 5,745,321

[45] Date of Patent: Apr. 28, 1998

[54] HIGH-TENSION TRANSFORMER PARTICULARLY FOR USE WITH DISCHARGE-TYPE TUBULAR LIGHTING FIXTURES

[75] Inventor: Jean-Phillippe Faure, Saint Martin sur Ocre, France

[73] Assignee: ICEM S.P.A., San Marino

[21] Appl. No.: 594,132

[22] Filed: Jan. 31, 1996

[51] Int. Cl.[6] .......... H02H 7/04

[52] U.S. Cl. .......... 361/38; 361/35; 361/115

[58] Field of Search .......... 361/42, 45, 58, 361/93, 115, 38, 35

[56] References Cited

U.S. PATENT DOCUMENTS 4,998,365 3/1991 Bezek .......... 40/451

*Primary Examiner*—Jeffrey A. Gaffin
*Assistant Examiner*—Stephen Jackson
*Attorney, Agent, or Firm*—Gottlieb, Rackman & Reisman

[57] ABSTRACT

A high-tension transformer incorporates a protection module (35) housed in a space defined between the body (11) of the high-tension transformer (10) and its cover (14), with plug-in connectors (36, 36') to be fitted between the body (11) and the module. In particular, the invention is suitable for transformers employed in discharge-type tubular lighting fixtures used for neon signs.

18 Claims, 2 Drawing Sheets

HIGH-TENSION TRANSFORMER PARTICULARLY FOR USE WITH DISCHARGE-TYPE TUBULAR LIGHTING FIXTURES

BACKGROUND OF THE INVENTION

A. Field of Invention

In general, this invention falls within the area of high-tension transformers that is, step-up transformers with a secondary voltage above 1000 volt.

B. Description of the Prior Art

High-tension transformers are currently used especially in discharge-type tubular lamps from which, for example, certain kinds of signs are made, known generally as transformers for neon signs.

Typically, such transformers consist of a housing having one portion having a body which encases a primary coil, a secondary coil and the corresponding magnetic core, most often completely encapsulated in a block of resin. Another portion of the housing consists of a tightly fitting cover over the body. The two portions jointly create a casing into which are arranged, separated from one another, input terminals for connecting the primary coil, and output terminals for connecting the secondary coil. For safety purposes, it is desirable, as well as required by various regulations, to protect the systems served by such high-tension transformers from possible grounding malfunctions, which are potentially the cause of a fire generating arc. Additionally, systems that are completely or in part readily accessible to people, for example, where the secondary may become exposed, when the system deteriorates or the vacuum in the neon tube is broken. In the first instance, the required protection to be provided is referred to as ground fault protection. In the second, it is referred to as open circuit protection.

In order to provide these protective features, incorporation of a protection module into the transformer has been proposed. Through connectors that establish a link between itself and the body of the transformer, the module provides switching devices for the primary coil. The switches are controlled through an appropriate sensor connected to the secondary coil for sensing a malfunction. When a malfunction occurs, the current flow to the primary is interrupted so that there is no voltage on the outputs of the secondary coil.

In most cases, the protection module is most of the time physically separate from the transformer and, in order to provide connection therewith, it is necessary to use a cable between the protection module and the input terminals on the body of the transformer. Thus, in this configuration, an extra cable is provided in addition to the conductors or wires connected to the transformer inputs and output.

A similar situation arises when the protection module is placed in the casing of the transformer itself. An extra cable is still needed between the module and the transformer coils.

One variation proposed has been to sink or encapsulate the protection module into the block of resin within the body of the transformer. In such case, no specific cabling needs to be provided in order to connect the protection module, but any change to it becomes impossible. However, as previously indicated, several types of protection may be required, depending on the type and/or installation of the system to be provided. Therefore, including the protection module in the resin block in the body of the transformer is undesirable if there is a need to modify said transformer to suit a variety of applications, and would require costly additional manufacturing steps to the detriment of cost savings.

OBJECTIVES AND SUMMARY OF THE INVENTION

Overall, the invention under discussion can be said to have as one of its objectives a capability that permits the elimination of these disadvantages.

More specifically, its objective is a high-tension transformer of the type consisting of the body encasing a primary coil, a secondary coil, and the corresponding magnetic core and a cover, firmly placed on the body, thus creating a casing in which are placed input terminals for connecting to the primary coil, and output terminals for connecting to the secondary coil. The transformer further includes a protection module, which provides switching devices to the primary coil through connectors that establish a link between the body and the module. The module controls the switches through a sensor connected to the secondary coil. This high-tension transformer is characterized by the fact that since the protection module is located within the casing created by the body and the cover and the connectors placed between the body and itself are plug-in type connectors.

For example, the connectors installed in the body of the transformer consist of jacks extending parallel to one another above the upper surface of its body. In a complementary manner, the connectors installed in the protection module consist of matching sockets, although an inverse configuration could also be provided.

In any event, the advantage to this protection module is its fixed yet removable placement and the fact that it can be connected simply by plugging it in, without the need for additional cabling.

It also has the advantage that a protection module of any type can be substituted for a protection module of the first type. For example, the module can be a simple shunt connector module lacking any kind of protection that may serve as replacement, when no protection is needed.

The high-tension transformer resulting from this invention therefore is well suited for use in a variety of very different equipment and installations, and is readily adaptable to improvements of such equipment and installations. Another advantage is that it can be produced using standardized manufacturing operations and structural components, resulting in cost savings.

BRIEF DESCRIPTION OF THE DRAWINGS

The features and advantages of this invention will become clear from the following description provided as an example, and with reference to the drawings wherein.

DETAILED DESCRIPTION OF THE INVENTION

Figure 4:
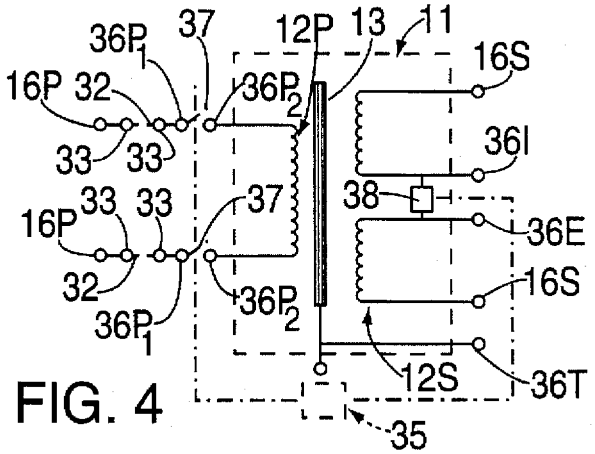
FIG. 4 shows a schematic for the embodiment of FIG. 3.

As illustrated by these drawings, a transformer 10, according to this invention, consists of a body 11 that, as indicated in FIG. 4, comprises a primary coil 12P, a secondary coil 12S and the corresponding magnetic core 13. Together, these components are usually referred to as the transformer's active components. The transformer 10 further consists of a cover 14 which, when firmly attached to the body 11 according to procedures described in greater detail below defines a casing 15, most easily visible in FIG. 2. The casing 15 includes input terminals 16P not visible in FIG. 2, but schematically shown in FIG. 4, for connecting the primary coil 12P to a feeder cable 18P, and output terminals 16S, also shown in FIG. 4, for connecting the secondary coil 12S to output cables 18S.

Figure 1:
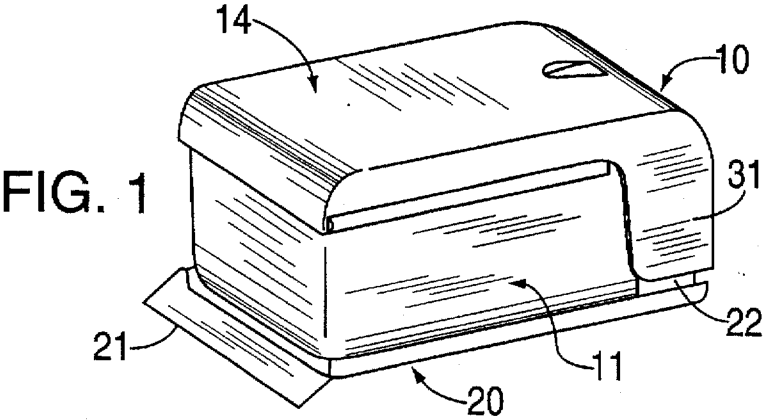
FIG. 1 shows a perspective view of a high-tension transformer according to this invention.
Figure 2:
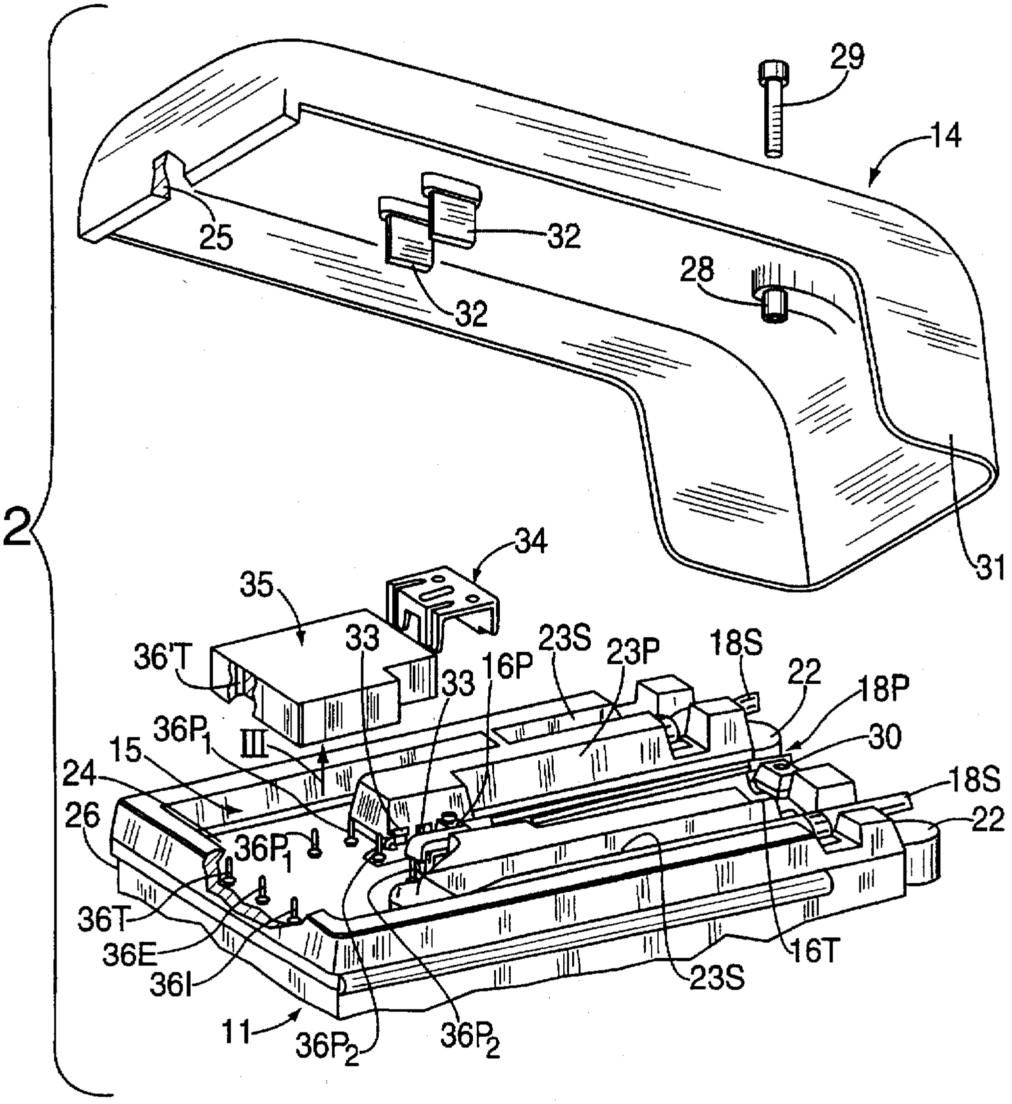
FIG. 2 shows, through enlargement partial perspective view of the transformer of FIG. 1 with the cover disengaged from the body.

The transformer is provided with a grounding terminal 16T visible in FIG. 2. There are two input terminals 16P and two output terminals 16S.

Preferably, the body 11 includes a block of resin inside which the primary 12P and secondary coil 12S as well as the magnetic core 13 are embedded or encapsulated.

In the embodiment shown, the body 11 is supported by a U-shaped iron bracket 20 having a base which is fitted with a grip 21 having two ends 22 extending beyond the body 11 as support for the various components. On its top surface, the body 11 forms a grooved channel 23P on one side of its mid-section to house a feeder cable 18P and to provide access the latter's conductors to the input terminals 16P and to the grounding terminal 16T. On both sides of this channel 23P, there are two other channels 23S to house the output cables 18S and to provide access to output terminals 16S.

The channels 23P, 23S, extend parallel to one another, starting at one end of the body 11, and covering only a fraction of its top surface. In another section of its top surface, the body 11 forms a cavity 24 for purposes that will become clear.

At one end, the cover 14 has a notch 25 across its surface, with a ledge facing its interior, which hooks onto an equivalent notch 26 facing the exterior of the body 11.

At its other end, the cover includes a sheathed perforation 28 through which a screw 29 comes into contact with a small threaded block 30 that protrudes from the upper side of the body 11 and which is aligned with the base of channel 23P. At this same end the cover 14 has an extension 31 with which it encloses the sides of the body 11 and the associated ends.

The cover 14 also includes, extending from the inside center, two electrically conducting prongs 32 that ensure continuity between contacts 33 placed between each of the entry terminals 16P and the primary coil 12P, as shown schematically in FIG. 4.

A cover bracket 34, perforated to allow penetration of prongs 32, is attached with a screw (not shown) over contacts 33 and over input terminals 16P.

These of the transformer 10 are well known, and are not part of the invention as such; hence they will not be discussed in any further detail.

In addition, a protection module 35 is also associated with the high-tension transformer 10. Using connectors that establish a link with the body 11 identified by the general reference numbers 36 and 36', the module 35 connects switches 37 between the primary coil 12P and the input terminals 16P as shown schematically by the broken lines in FIG. 4. These switches 37 are controlled through a sensor 38 connected to the secondary coil 12S.

Importantly, according to the invention, with a protection module 35 that is disposed in the casing 15 defined by the body 11 and the cover 14, the connectors 36 and 36' placed between the body 11 and said module 35 are plug-in type connectors.

Connectors 36 are mounted on the body 11, whereas connectors 36' are part of the protection module 35.

For example, as shown in FIG. 2, connectors 36 in the body 11 consist of jacks that extend parallel to one another from the upper surface of the body 11; similarly, connectors 36' of the protection module 35 are complementary sockets included for this purpose on the bottom surface of the module 35.

Because connectors 36 and 36' are well known, they will not be described in greater detail here. Preferably, connectors 36 are placed in the designated cavity 24 on the top side of said body 11.

Likewise, preferably, the switches 37 that are part of the protection module 35 consist of electromechanical switching devices. For example, these may be mobile contacts controlled by a simple relay (not shown). There are two such switches 37, one for each input terminal 16P, with each of them being interposed between two connectors 36P1 and 36P2. Hence there are two connectors 36P1 and two connectors 36P2 on the body 11.

Finally, preferably at least two additional types of protection modules 35 may be provided for the transformer, the modules being interchangeable.

For example, protection module 35 is constructed and arranged to provide ground fault protection as well as open circuit protection. For this purpose, the sensor 38 therefore is disposed at the mid-point on the secondary coil 12S, between two connectors 36I, 36E. A connector 36T is also included in order to ground the protection module 35. Connector 36T may also be used for grounding of the magnetic core 13. Thus there is a total of seven connectors: 36PI, 36P2, 36I, 36E, and 36T to be placed in the cavity 24 of the body 11. Correspondingly, the protection module 35 has an equal number of complementary connectors: 36'P1, 36'P2, 36'I, 36'E, and 36'T. Because the structure of the sensor 38, as well as of the protection module 35 are well known, and as such are not part of the invention, they will not be described further.

Figure 5:
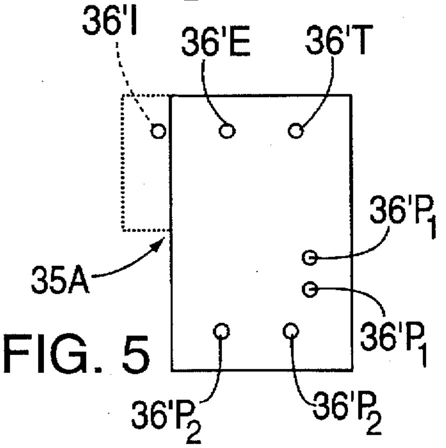
FIGS. 5 and 6 are views analogous to those of FIGS. 3 and 4, for a second embodiment of the protection module.
Figure 6:
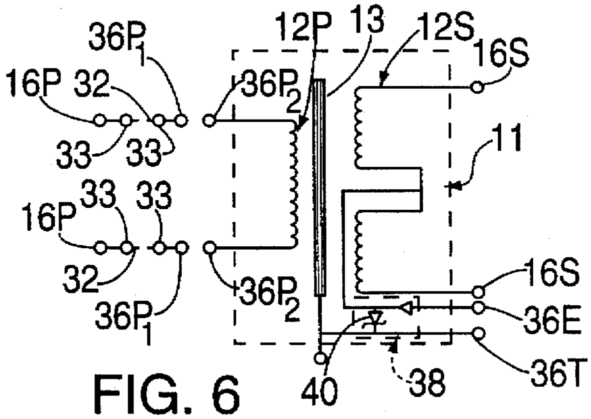

FIGS. 5 and 6 show a protection module 35A arranged and constructed to provide only ground fault protection. In this embodiment the sensor 38 essentially comprises only one simple Zener 40 diode linked as a shunt, or in parallel between the mid-point of the secondary coil 12S defined by connector 36E and ground connector 36T.

Under these circumstances, no connector of the 36I type is necessary.

In this case, only six connectors are needed on the body 11, that is, connectors 36P1, 36P2, 36E, and 36T, and the protection module 35 correspondingly comprises six connectors: 36'P1, 36'P2, 36'R, and 36'T.

Figure 3:
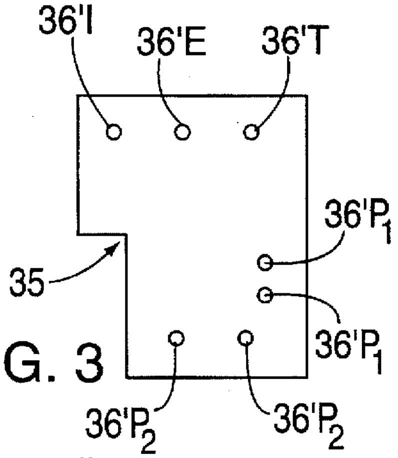
FIG. 3 is a bottom view of one protection module incorporated into the high-tension transformer, from an angle roughly according to arrow III in FIG. 2.

Nonetheless, in order to standardize assembly of the transformer and the manufacture of components, it is preferable for the body 11 to include the maximum number of connectors necessary to ensure that it can be adapted to any foreseeable types of protection modules 35. In other words, preferably the body contains initially not only connectors 36P1, 36P2, 36E, and 36T, needed for a protection module 35A that provides only ground fault protection, but also connector 36I needed for a protection module 35 that also provides open circuit protection. In order to prevent connector 36I from interfering with the engagement of a protection module 35A that provides only a differential protection, preferably it should be spaced away from the other connectors. For this reason the diagram for protection module 35A has a narrower profile as shown in FIG. 5 than in FIG. 3 across the connectors 36'E and 36'T. In this way module 35A can be plugged into connectors 36E and 36T, as well as into 36P1 and 36P2, without interference from connector 36I. Alternatively, connector 36I may be removable from the body 11.

Likewise, as another embodiment shown by the broken line in FIG. 5, the protection module 35 may include a connector 36'I, even when it is useful only for ground fault protection but, in this case, the 36'I connector is idle.

Other additional connectors 36 may be positioned and arranged like connector 36I as required. In other words, at least one of the 36-type connectors that are part of the body 11 can be spaced apart from the other and/or at least one of them can be removable.

Figure 7:
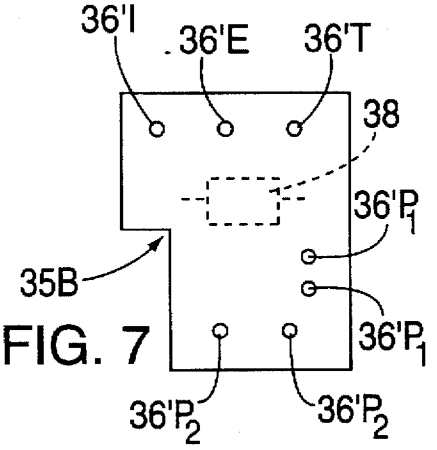
FIGS. 7 and 8 are also analogous to FIGS. 3 and 4 showing a different way of inserting the protection module's control sensor.
Figure 8:
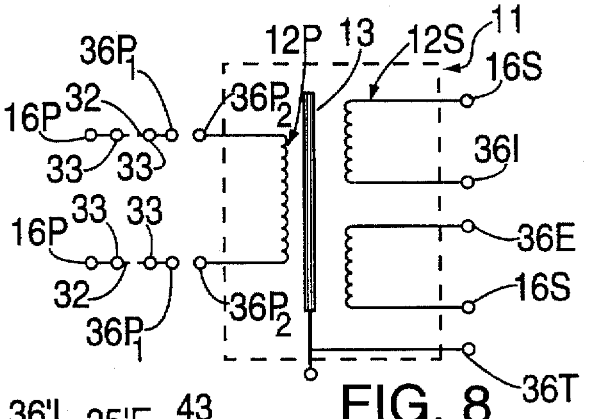

In the above discussion it has been assumed that sensor 38 is also included in the body 11. As an alternative, the sensor can be placed on the protection module 35B, as shown in FIGS. 7 and 8. In FIGS. 7 and 8, the protection module 35B is usable either for ground fault protection or for open circuit protection, but of course it may also serve for ground fault protection only. In any case, the linking of a similar protection module 35 presupposes that it simply plugging into the 36-type connectors on the body 11. Therefore, no cabling is necessary to provide connections for the primary coil 12P.

Figure 9:
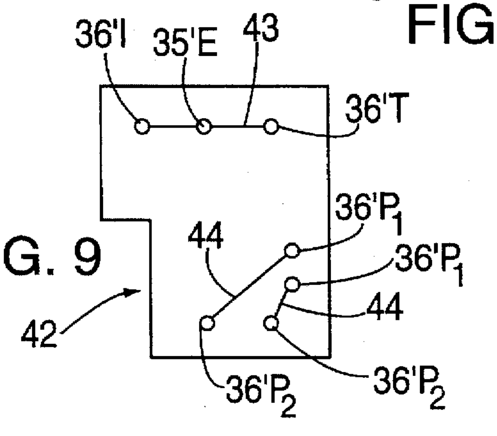
FIG. 9 is a view analogous to FIG. 3 for a simple connector module.

As shown schematically in FIG. 9, another connector module 42 may be associated with a high-tension transformer 10 for the purpose of providing a simple shunt between the 36-type connectors that are part of the body 11, without, at the same time providing any protection. Just as for either of the other protection modules 35, 35A, 35B, described earlier, and as replacement for a similar module 35 of protection, the installation of the connector module 42 likewise takes place simply by plugging it into the connectors.

Preferably, the connector module 42 is equipped with complementary 36'-type connectors, specifically connectors 36'I, 36'E, 36'T, 36'P1, and 36'P2. Connectors 36'I, 36'E, and 36'T are simply linked together with a common electrically conducting bar 43, and connectors 36'P1 and 36'P2 are connected two by two with small bars 44.

Of course, the present invention is not limited to the forms of implementation describe and shown, but globally encompasses any and all variants executed, and/or any and all combinations of their various elements, in particular as regards the number and nature of the intermediate connection between the protection module and the body of the high-tension transformer, and/or as regards the nature of the protection or protections required by the protection module.

In addition, a model that is reversed vis-a-vis the one described and shown herein, may have socket-type connectors on the top surface of the transformer body, while the corresponding connectors on the protection module may consist of complementary jacks extending parallel to one another below the bottom of the protection module.

I claim:

1. A modular high tension transformer system comprising:

a body which contains a primary coil, a secondary coil and a corresponding magnetic core;

a cover which is attached securely on said body to create a casing in which are arranged input terminals for connection to the primary coil, and output terminals for connection to the secondary coil;

a plurality of interchangeable modules for providing different kinds of electrical protection; and a connector for selectively connecting said one module to said terminals;

wherein several different high transformer assemblies are formed by inserting one module of said plurality of modules into said casing and connecting said one module to said terminals through said connector to said coils to provide a corresponding protection.

2. The transformer system of claim 1 wherein at least some of said modules include switches, and said system further comprises a controller disposed in said casing to control said switches.

3. The system of claim 1 wherein said connector includes jacks attached to said body and complementary sockets disposed in said casing.

4. The system of claim 1 further comprising a microprocessor for controlling said switches.

5. The system of claim 1 wherein said connector includes a plug-in-connector.

6. The system of claim 1 further comprising a sensor disposed in said module to detect said a sensed parameter and a microprocessor receiving said sensed parameter and controlling said switches based on said sensed parameters.

7. The system of claim 1 wherein said jacks are disposed on said modules and said sockets.

8. The system of claim 1 wherein said modules are selected from a group of protective modules, each said modules being arranged and constructed to provide a corresponding preselected protection circuit.

9. The system of claim 8 wherein said protection circuit includes one of a ground protection circuit, an open wire protection circuit.

10. The system of claim 1 further comprising a sensor disposed in said casing to detect a sensed parameter and a microprocessor receiving said sensed parameter and controlling said switches based on said sensed parameter.

11. The system of claim 10 wherein said sensor is disposed in said one module.

12. The system of claim 11 wherein said connector includes jacks and plugs.

13. The system of claim 11 wherein said jacks are attached to said casing and said plugs are disposed in said casing.

14. A modular high voltage transformer system comprising:

a body housing a transformer formed of a primary coil, a secondary coil and a magnetic core;

a cover cooperating with said body to define an enclosure;

a plurality of interchangeable protective modules sized and shaped to fit into said enclosure, said plurality including a first module arranged and constructed to provide ground protection only, a second module arranged and constructed to provide open circuit and ground protection; and a connector for connecting the module disposed in said enclosure to said transformer;

wherein a plurality of different transformers are defined by selectively inserting one of said interchangeable modules into said enclosure.

15. The system of claim 14 further comprising a sensor for sensing a preselected condition and generating a corresponding sensed signal and a controller for activating said protective model in the presence of said sensed signal.

16. The system of claim 15 wherein said sensor is disposed in said protective module.

17. The system of claim 15 further comprising switches for disposed in at least one of said modules, and a controller for controlling said switches.

18. The system of claim 15 wherein said plurality of modules includes a third module for shunting at least some of said connections.

* * * * *